B. TAYLOR.
DUMPING MECHANISM FOR TRUCKS.
APPLICATION FILED FEB. 12, 1921.

1,383,498.

Patented July 5, 1921.
4 SHEETS—SHEET 1.

Witness:-
Chas. L. Griesbauer

Inventor
Blake Taylor,
By
H. E. Dunlap,
Attorney

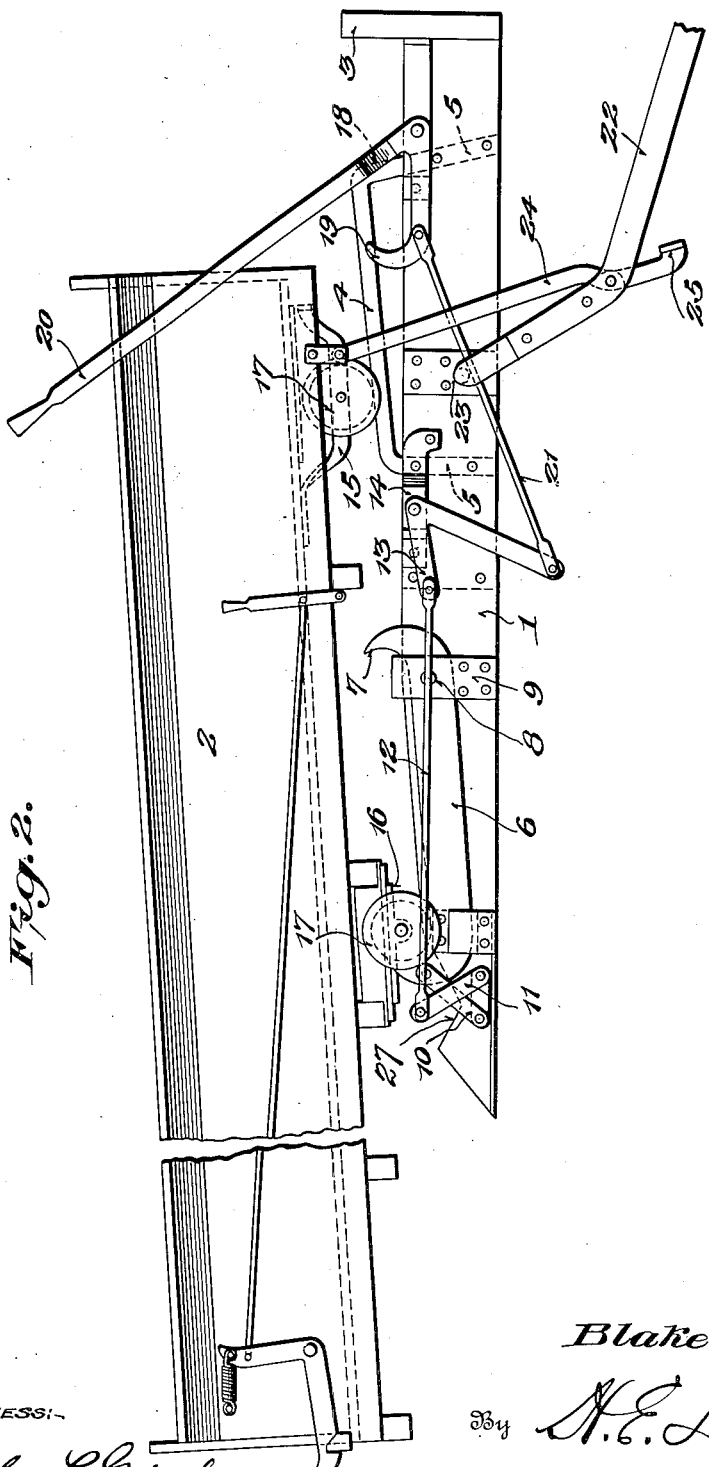

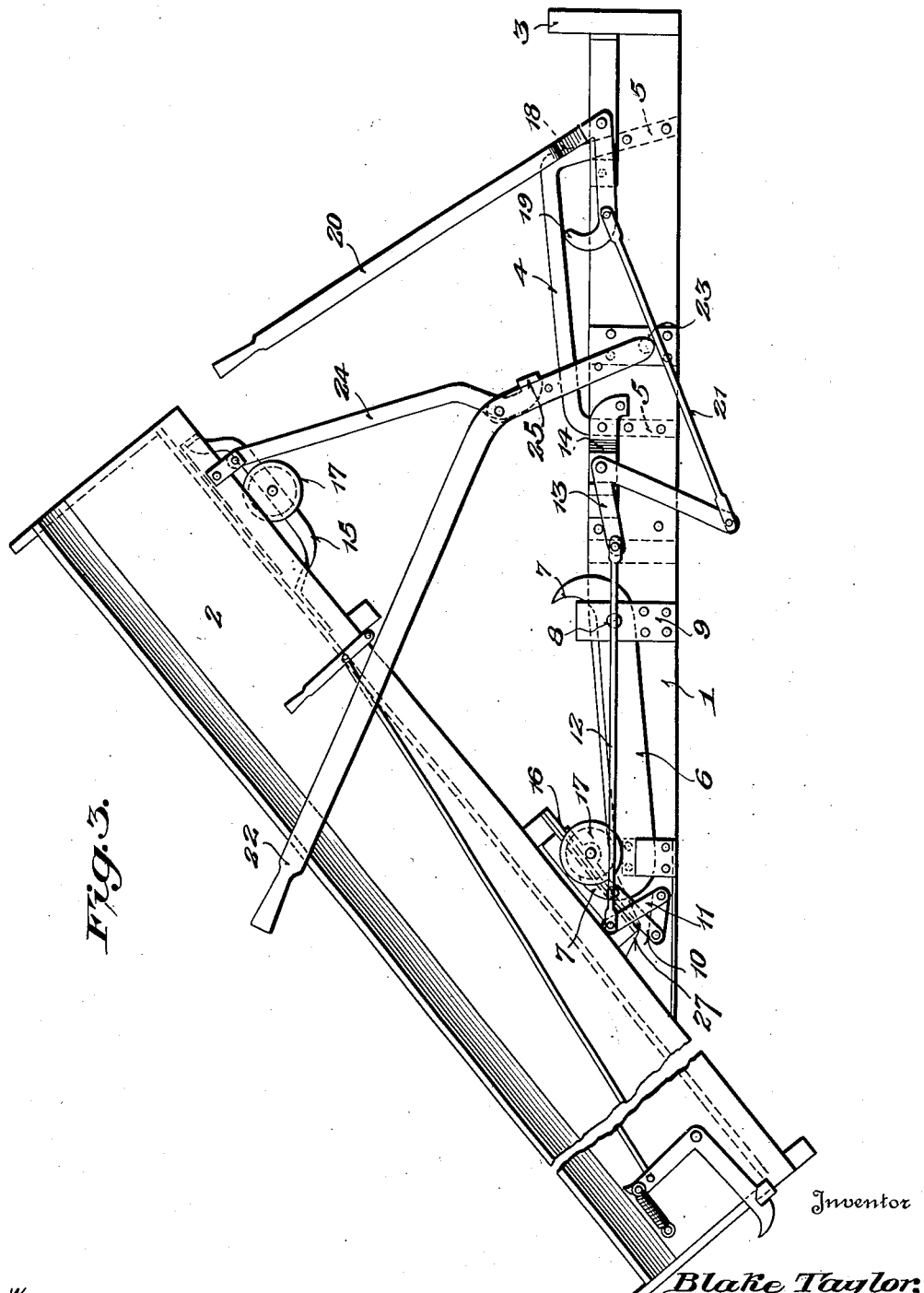

B. TAYLOR.
DUMPING MECHANISM FOR TRUCKS.
APPLICATION FILED FEB. 12, 1921.
1,383,498.
Patented July 5, 1921.
4 SHEETS—SHEET 4.
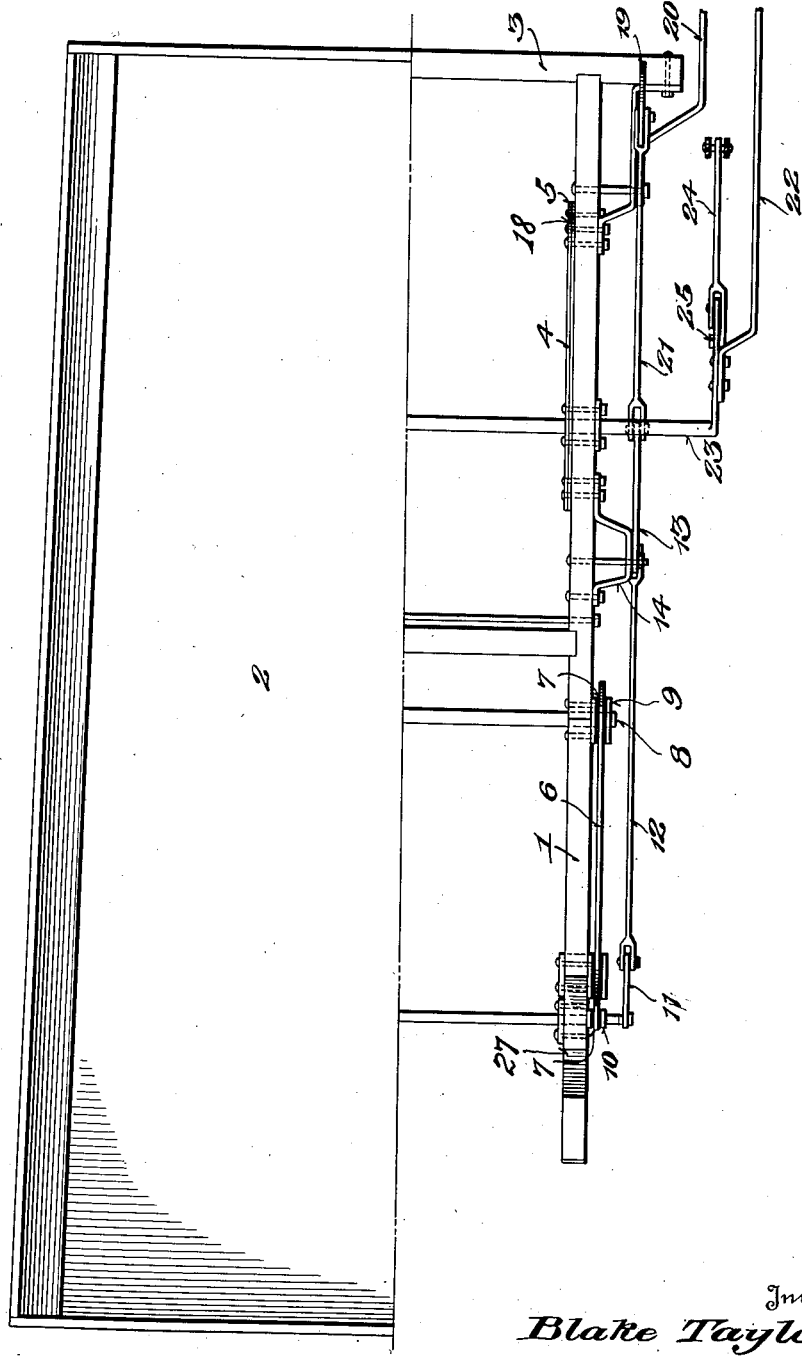
Inventor
Blake Taylor,
Witness:
By
Attorney

UNITED STATES PATENT OFFICE.

BLAKE TAYLOR, OF ROANOKE, VIRGINIA.

DUMPING MECHANISM FOR TRUCKS.

1,383,498. Specification of Letters Patent. Patented July 5, 1921.

Application filed February 12, 1921. Serial No. 444,504.

*To all whom it may concern:*

Be it known that I, BLAKE TAYLOR, a citizen of the United States of America, and resident of Roanoke, county of Roanoke, and State of Virginia, have invented certain new and useful Improvements in Dumping Mechanism for Trucks, of which the following is a specification.

This invention relates broadly to dump trucks, and more specifically to dumping mechanism for such trucks, and it has for its primary object to provide improved mechanism whereby the force of gravity is largely utilized for moving the truck body both to and from dumping position and in the operation of which a minimum of manual effort is required.

The invention contemplates supporting the dump body on forward and rearward runways or tracks and embodies means whereby the rear runway may be disposed either in a normal position wherein the dump body can not be shifted to dumping position or in a position wherein the body may move down the same by gravity.

It is a further object of the present invention to provide a dump body normally disposed off, or in inoperative relation to, the forward runway or track and means for replacing said body on said track simultaneously with the disposition of the rearward track in an abnormal operative position.

The invention resides in the features of construction, arrangement of parts and combinations of elements which will hereinafter be described in detail, reference being had to the accompanying drawings, in which—

Fig. 2 is a similar view showing the body shifted rearwardly to an intermediate position preparatory to dumping;

Fig. 3 shows the body in its full dumping position; and—

Fig. 4 is a top plan view of the dump truck, one-half of the body being removed to show more clearly the underlying dumping mechanism.

Figure 1:
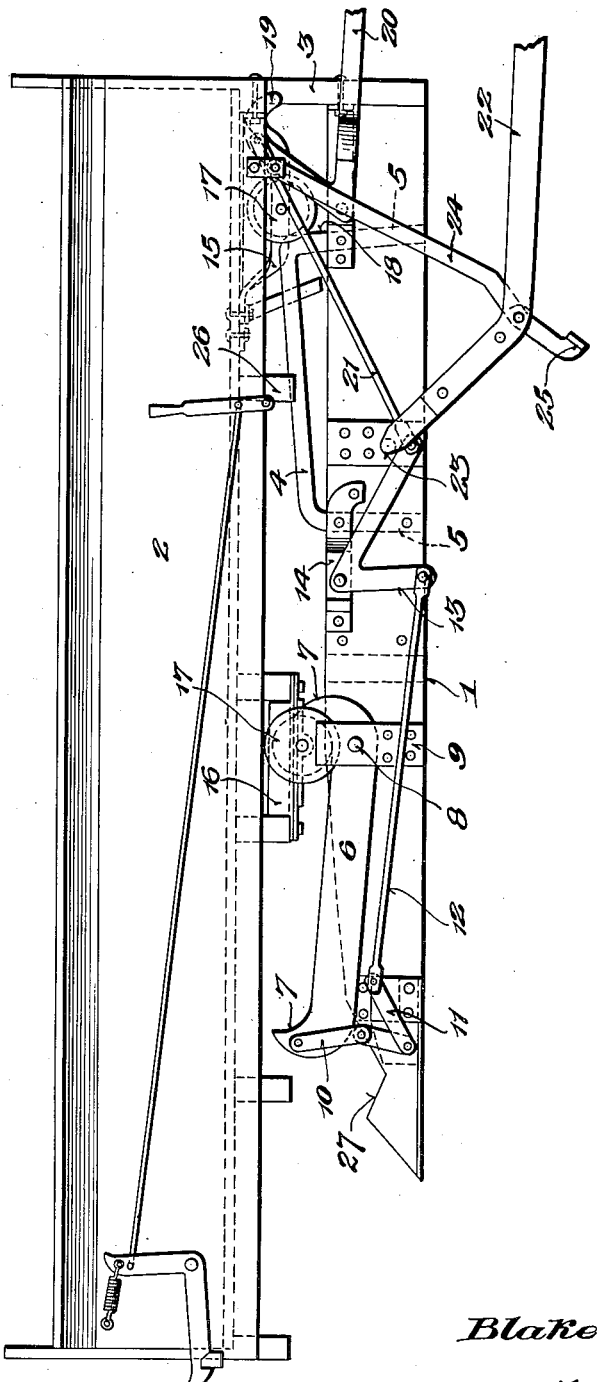
Figure 1 is a side elevation of the improved dump truck, depicting the dump body and its manipulating and controlling mechanisms in their normal load-carrying position.

Referring to the drawings, longitudinally extending sills 1 have their rear ends beveled and have recesses 27 formed in their upper edges adjacent to said ends to provide sufficient space for the accommodation of parts carried by the under side of the dump body 2, the latter when in its normal position having its front end resting upon a transverse bolster 3 carried by said sills. The base frame composed of said sills 1 and the transverse bolster 3, together with reinforcing frame members, is adapted to be permanently mounted on the chassis of a motor vehicle or other wheeled carriage.

On the forward end of each side sill member is a fixed track or runway 4 consisting of a rearwardly and downwardly inclined rail section having downturned terminals constituting supporting legs 5 which are secured to the side sills. Each sill also supports a rear track 6 which has upwardly curved terminal stops 7 formed at its opposite ends and which is pivotally mounted adjacent to the forward end stop upon a pivot pin 8 carried by a bracket 9 attached to the sill. The rear or free end of the track 6 is connected by a downwardly extending link 10 to one arm of a bell crank lever 11 which is pivoted to the adjacent sill and which has its other arm linked, as by a long rod 12, to one arm of a second bell crank lever 13, the latter being pivoted to an outstanding bracket 14 on said sill.

Journaled in bearings 15 and 16 carried on the under side of the dump body 2 are forward and rearward pairs of rollers or wheels 17 adapted to respectively move over the tracks 4 and 6 to carry the dump body to and from dumping position, the forward set of wheels being so spaced from the rearward set as to ride off the forwardly and upwardly inclined track 4 and engage against the forward edge of the front leg 5, which constitutes a retaining shoulder 18 therefor, when the rearward set of wheels is disposed in the seat provided by the forward terminal stops 7, as shown in Fig. 1. In this connection it will be noted that the axis of the rear set of wheels is in substantial vertical alinement with the pivotal mounting 8 of the swinging or tilting tracks 6 so that a minimum of manual effort will be required to positively swing said tracks from their normal slightly downwardly and forwardly inclined position, shown in Fig. 1, to the downwardly and rearwardly inclined position shown in Figs. 2 and 3. It will further be noted that when the rear tracks 6 are tilted rearwardly they will exert a rearward pull on the rear set of wheels 17 and thereby initiate rearward travel of the body over the tracks 4 and 6, assuming that the front end of the body has been elevated to disengage the forward wheels from the shoulders 18. The front end of the body is elevated by means of a bell crank lever having a short arm 19 provided with a curved bearing terminal which normally occupies a position in engagement with the under side of the body and whose long arm 20 is extended forwardly to provide a handle of good leverage. By swinging the hand lever 20 upwardly slightly from the position indicated in Fig. 1, the front end of the body is elevated on the curved arm 19 to a position in which the front wheels 17 mount upon the tracks 4. Concurrently with this action the rear tracks 6 are tilted rearwardly to effect slight rearward movement of the body to bring the front wheels over the upper ends of the tracks 4, such concurrent action taking place by reason of a link connection 21 between the arm 19 and the forward arm of bell crank lever 13. Both sets of wheels being now disposed on rearwardly and downwardly inclined tracks, the body will gravitate rearwardly, aided by the impetus given by the tilting action of the tracks 6, until stopped by engagement of the rear wheels with the rear terminal stops 7. When in this position, the body is readily tilted by means of a lever 22 which is pivoted to the adjacent side sill at 23 and which has pivoted thereto intermediate its ends one end of a link 24 that is pivotally attached at its opposite end to the forward end of the body, said link having a limit stop 25 for arresting the body at dumping position.

While in its normal inoperative position, the dump body is steadied against lateral dislodgment not only by means of the wheel flanges but also by the guide lugs 26 coacting with tracks 4 and brackets 9 coöperating with the rear set of wheels. The shoulders 18 incline upwardly to the rear since the combined functioning of the arm 19 and forward terminal stop 7 will cause the front wheels to move at a vertical angle. The rear tracks are normally disposed to prevent retrograde movement of the body 2, and, therefore, should the front end of the body become accidentally elevated, it will not shift until the track 6 are positively lowered by breaking the support embodying link 10 and bell crank 11. When the tracks 6 are tilted rearwardly, rearward movement of the body is facilitated by reason of the shifting of the center of gravity of the body.

In returning the body to loading or normal position, the same is lowered by lever 22 to bring the forward wheels to operative position on the tracks 4, and, then, by swinging lever 20 forwardly and downwardly, the tracks 6 are raised so as to tilt forwardly to such a degree as to return the body to loading position by gravity. The tilting track, therefore, not only assists materially in dumping the body but also in returning the same to loading position. When the tracks 6 are elevated to normal position, the load will have been dumped and the weight to be lifted will therefore be so greatly reduced that little effort will be required.

What is claimed is:

1. A dump truck comprising sills, a dump body superposed thereover, wheels journaled on the under side of the body, tiltable tracks pivoted adjacent one end to the sills for supporting the wheels and formed with means for arresting the wheels at normal position in approximate vertical alinement with the pivotal mounting for the tracks, and means for tilting the tracks.

2. A dump truck comprising sills, a dump body superposed thereover, wheels journaled on the under side of the body, tiltable tracks pivoted adjacent one end to the sills for supporting the wheels and having terminals stops, the forward stops acting to arrest the wheels in approximate vertical alinement with the pivotal mounting of the tracks, and means for tilting the tracks.

3. A dump truck comprising sills, a dump body superposed thereover, wheels journaled on the under side of the body, tiltable tracks pivoted adjacent one end to the sills for supporting the wheels and having terminal stops, the forward stops acting to arrest the wheels in approximate vertical alinement with the pivotal mounting of the tracks, a bell crank lever pivoted on the sills, a link connection between the rear ends of the tracks and one arm of the bell crank lever, and means attached to the other arm of said lever for effecting tilting of the tracks.

4. A dump truck comprising a supporting structure, a dump body superposed thereover, wheels journaled on the body, forward and rearward tracks mounted on the structure for supporting the wheels, one track being tiltable, and means for tilting the last mentioned track.

5. A dump truck comprising a supporting structure, a dump body superposed thereover, wheels journaled on the body, forward and rearward tracks mounted on the supporting structure for supporting the wheels, one track being fixed and inclined downwardly and rearwardly and the other track being tiltable rearward to an inclined position whereon the wheels may travel to dumping position, said tiltable track preventing such movement when tilted forwardly, and means for controlling the tiltable track.

6. A dump truck comprising a supporting structure, a dump body superposed thereover, wheels journaled on the body, forward and rearward tracks mounted on the structure for supporting the wheels, one track being fixed and inclined rearwardly toward dumping position and the other track being tiltable rearward to an inclined position whereon the wheels may travel to dumping position, the fixed track having its front end forming a stop against which the front wheels rest when the body is in loading position and preventing movement of the body to dumping position, and means for elevating the wheels upon the fixed track and simultaneously tilting the tiltable track.

7. A dump truck comprising a supporting structure, a dump body superposed thereover, wheels journaled on the body, forward and rearward tracks mounted on the structure for supporting the wheels, one track being fixed and inclined rearwardly toward dumping position and the other track being tiltable from a forward and downward inclination to a downward and rearward inclination, the fixed track wheels being disposed off the upper end of the fixed track when the body is in loading position and engaging said end as a stop to prevent movement of the body to dumping position, means for elevating the body to withdraw the fixed track wheels from said stop; and means for moving the body to replace the wheels on the fixed track when elevated.

8. A dump truck comprising a supporting structure, a dump body superposed thereover, wheels journaled on the body, forward and rearward tracks mounted on the structure for supporting the wheels, one track being fixed and inclined downwardly and rearwardly toward dumping position, and the other track being tiltable downward and rearward to permit the rear wheels to travel thereover to dumping position, the fixed track wheels being disposed off the upper end of the fixed track when the body is in loading position and engaging said end as a stop to prevent movement of the body to dumping position, said tiltable track having an upstanding terminal at its forward end adapted to initiate rearward travel of the body toward dumping position through force applied thereby to an adjacent wheel when the track is tilted, and means for simultaneously elevating the front end of the body and tilting the movable track.

9. In a dump truck, a rearwardly inclined forward track, a tiltable rearward track, a dump body having wheels running over the tracks, and means for tilting the movable track rearwardly and forwardly to cause the body to gravitate to and from dumping position, respectively.

10. In a dump truck, a rearwardly inclined forward track, a tiltable rearward track, a dump body having wheels for travel upon said tracks, and means for tilting the movable track to cause the body to gravitate to and from dumping position, and means for tilting the body about the rear wheels as a pivot.

11. In a dump truck, a tiltable track having upturned terminal stops, means adjacent one end for pivotally mounting the track, and a dump body having a wheel operating upon the track, said wheel when engaged with one stop being disposed approximately over the pivotal mounting of the track to minimize the effort required to tilt the track.

12. In a dump truck, a tiltable track having upturned terminal stops, means adjacent one end for pivotally mounting the track, and a dump body having a wheel for travel upon the track, said wheel when engaged with one stop being disposed approximately over the pivotal mounting of the track to minimize the effort required to tilt the track, and said wheel when engaged with the opposite stop serving as a pivot for vertically tilting the body.

In testimony whereof I affix my signature in presence of two subscribing witnesses.

BLAKE TAYLOR.

Witnesses:
CULVER H. COOK,
ROBERT F. DAVIS.